(12) United States Patent
Watson (10) Patent No.: US 8,491,193 B2
(45) Date of Patent: Jul. 23, 2013

(54) PRESS FITTING INTERFACE FOR HOLDING A TRACK TO AN EXTRUSION WITHOUT THE USE OF FASTENERS; AND METHODS FOR USING THE SAME

(75) Inventor: Nigel S. Watson, Martinez, CA (US)

(73) Assignee: Bishop-Wisecarver Corporation, Pittsburg, CA (US)

( * ) Notice: Subject to any disclaimer, the term of this patent is extended or adjusted under 35 U.S.C. 154(b) by 1122 days.

(21) Appl. No.: 12/260,754

(22) Filed: Oct. 29, 2008

(65) Prior Publication Data
US 2010/0104225 A1     Apr. 29, 2010

(51) Int. Cl.
*F16C 19/00* (2006.01)
*F16C 29/04* (2006.01)

(52) U.S. Cl.
CPC .................................. *F16C 29/045* (2013.01)
USPC ............................................... 384/55; 384/58

(58) Field of Classification Search
USPC ........ 384/50, 53, 54, 55, 57, 58, 59; 403/373, 403/374.1, 381; 248/307, 313
See application file for complete search history.

(56) References Cited

U.S. PATENT DOCUMENTS

| | | | |
|---|---|---|---|
| 1,470,090 A | 10/1923 | Manning | |
| 1,500,118 A | 7/1924 | Ellis | |
| 3,210,716 A | 10/1965 | Meacham | |
| 3,416,282 A * | 12/1968 | Daugherty | 52/716.8 |
| 3,461,466 A * | 8/1969 | Stahlhut et al. | 4/557 |
| 3,661,431 A | 5/1972 | Wisecarver | |
| 3,848,388 A | 11/1974 | Bretche | |
| 3,893,271 A | 7/1975 | Kotlarz | |
| 4,057,312 A | 11/1977 | Hagermo | |
| 4,497,148 A | 2/1985 | Lopez | |
| 4,694,531 A | 9/1987 | Foy | |
| 4,826,438 A | 5/1989 | Torres | |
| 5,145,418 A | 9/1992 | Moranski et al. | |
| 5,482,026 A | 1/1996 | Russell | |
| 5,513,916 A | 5/1996 | Takei | |
| 5,553,947 A * | 9/1996 | Scheib et al. | 384/55 |
| 5,794,901 A | 8/1998 | Sigel | |
| 5,833,417 A | 11/1998 | Sargent et al. | |
| 5,950,773 A | 9/1999 | Ito | |
| 6,484,997 B1 | 11/2002 | Edwards et al. | |
| 6,634,149 B2 | 10/2003 | Cates et al. | |
| 6,746,055 B1 | 6/2004 | Wood et al. | |

(Continued)

FOREIGN PATENT DOCUMENTS

| | | |
|---|---|---|
| DE | 4109286 C2 | 10/1994 |
| EP | 0258714 B1 | 6/1990 |
| WO | WO-02/038473 | 5/2002 |
| WO | 2011087468 A1 | 7/2011 |

OTHER PUBLICATIONS

International Search Report and Written Opinion, mailed Apr. 13, 2010, for related PCT application No. PCT/US2009/069289, 9 pages.
Integral V Linear Guide: Snap-In Series; Jul. 18, 2008; PBC Linear, 2 pages.
Industrial Profile Systems, Catalog 1816, Linear Applications; 2002; Parker Automation, Parker Hannifin Corporation, pp. 148-173.

(Continued)

*Primary Examiner* — James Pilkington
(74) *Attorney, Agent, or Firm* — Michael A. Glenn; Glenn Patent Group (57) ABSTRACT

The present invention provides novel approaches to manufacturing and assembling linear motion slides that are quick and easy to install without requiring the use of fasteners. Additionally, the present invention discloses a novel track assembly apparatus that couples with standard linear motion support bases without the use of fasteners.

20 Claims, 7 Drawing Sheets

U.S. PATENT DOCUMENTS

| | | |
|---|---|---|
| 6,993,875 B2 | 2/2006 | Rudduck |
| 7,163,178 B2 | 1/2007 | Ricaud |
| 2008/0112656 A1* | 5/2008 | Shirai et al. ............ 384/45 |
| 2009/0226122 A1 | 9/2009 | Schroeder |
| 2011/0110616 A1 | 5/2011 | Watson |

OTHER PUBLICATIONS

Bishop-Wisecarver Corp.; "DualVee Motion Technology", Catalog: Components, Technical Specifications, Aug. 2007, 32 pages.

* cited by examiner

PRESS FITTING INTERFACE FOR HOLDING A TRACK TO AN EXTRUSION WITHOUT THE USE OF FASTENERS; AND METHODS FOR USING THE SAME

BACKGROUND OF THE INVENTION

1. Technical Field

The invention relates generally to methods and apparatus for assembling a linear track in a guided motion system. In particular, the invention relates to a track assembly that supports a quick and easy method of assembly of linear tracks to standard extrusions.

2. Description of the Prior Art

In manufacturing processes and within manufactured capital goods themselves, precise and repeatable motion is useful and often essential. For example, in manufacturing processes ranging from machining to textiles to electronics, tool heads or other items move back and forth and must do so precisely and repeatedly over enormous numbers of cycles. In another example, specimens and instrumentation move relative to each other within laboratory analytic devices to collect data on the samples and must do so precisely and repeatedly.

Guide wheels attached to support bases and riding on rails is one class of guided motion technology that provides precise and repeatable kinematics. For example, U.S. Pat. No. 3,661,431 discloses guide wheels and tracks in which guide wheels cooperate with rails such that the guide wheels may move along the rails.

Figure 1:
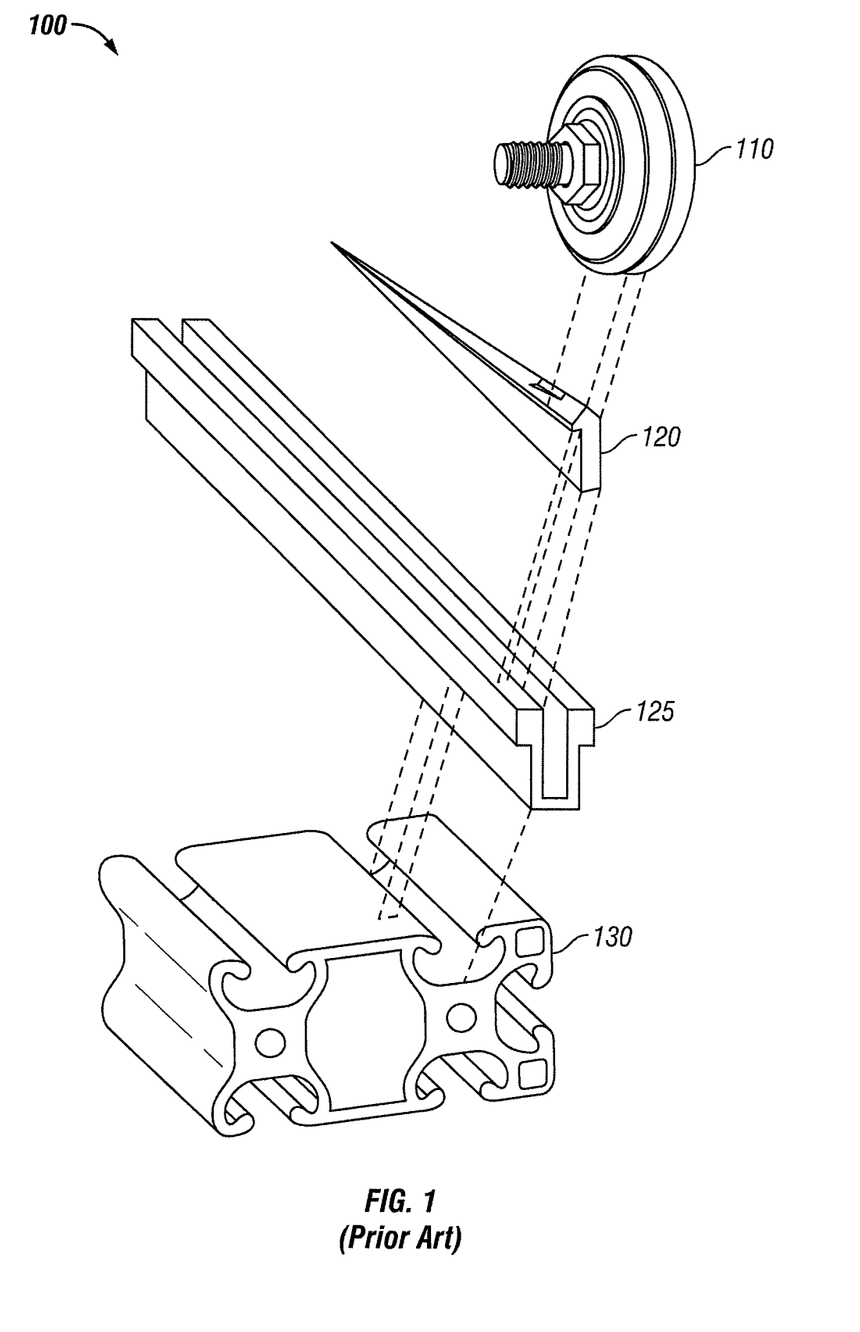
FIG. 1 is an exploded view of a guided motion assembly requiring fasteners previously known in the art.

An exemplary track used in guided motion application is shown in FIG. 1. FIG. 1 illustrates an exploded view of a guided motion apparatus 100 as known in the prior art. FIG. 1 shows a "Vee" edge track 120 and the DualVee® guide wheel 110 both manufactured by Bishop-Wisecarver Corporation. The track 120 is coupled with a support base (aka extrusion) 130.

Known support bases are typically available in a standard size and configuration. For example, the extrusion 130 shown in FIG. 1 is a representation of a standard aluminum extrusion support base manufactured by Parker Hannifin Corporation which is widely used within the guided motion industry.

Also widely used in the guided motion industry are track assemblies for coupling the track with the support base. FIG. 1 illustrates a known track assembly 125 for coupling the "Vee" edge track 120 to a standard extrusion 130. Previous attempts to provide track assemblies to fit standard support bases have been complicated, time consuming, difficult to assemble due to the requirement of fasteners, expensive to assemble, and unreliable due to the use of moving parts, among other shortcomings. However, there are many disadvantages to the current state of the art. For example, known track assemblies require the use of fasteners (not shown) to couple the track assembly 125 and the track 120. Requiring the use of fasteners necessitates more parts, a more expensive manufacturing process, more susceptibility to movement between the parts, resulting in an unsatisfactory guided motion apparatus which requires a finely tuned system.

Due to the deficiencies of the prior art, there is a need to provide a reliable, effective and easy to assemble track assembly for use with linear motion support bases. Therefore, it is an object of the present invention to provide a track assembly that effectively couples with a standard support base without the use of fasteners.

It is another object of the invention to provide methods of manufacturing track assemblies that effectively couple with a standard support base without the use of fasteners. Additionally, it is an object of the invention to provide methods of assembling guided motion systems using fastener-less assembly techniques.

SUMMARY OF THE INVENTION

The present invention provides novel approaches to manufacturing and assembling linear motion slides that are quick and easy to install without requiring the use of fasteners. Furthermore, the present invention discloses a novel track assembly apparatus that couples with standard linear motion support bases without the use of fasteners.

The elimination of fasteners results in lower cost, faster assembly, and increased structural integrity due to the elimination of drill holes and/or tapped holes in the track. According to some embodiments of the present invention, traditional fasteners are replaced with deformable teeth protrusions.

It is an object of the present invention to utilize track clamps having a pressure insert portion with teeth protrusions that deform upon coupling with the support base. The deformation of the track clamp teeth ensures a tight fit without the use of fasteners.

Various embodiments of the present invention include track assemblies designed to couple tracks to support bases in a variety of configurations including tracks disposed normal to the support base and tracks disposed orthogonal to the support base. In some embodiments of the present invention, the track clamps are designed with shoulder extensions to provide extra support withstand torque on the track.

In some embodiments of the present invention, the track clamp apparatus is especially designed to suit any slot in a wide variety of extrusions or barstock material. In the preferred embodiment of the present invention, the track clamp enables the user to integrate the "Vee" edge track manufactured by Bishop-Wisecarver Corporation into the T-slots of standard structural extrusion support bases.

Some embodiments of the present invention teach low cost methods of installing linear motion tracks into structural extrusion support bases. In some embodiments, the novel track clamp is simply installed using a soft-headed mallet. In some other embodiments, the track is able to be installed by using a cross-head arrangement of rollers to uniformly apply force to insert the track clamp and track into standard structural extrusion support bases. In some embodiments, the track clamp and track are assembled in a factory. In some other embodiments, the track and track clamp are assembled by an end user.

In some embodiments of the present invention, the track clamps are integrated with widely available standard aluminum extrusion support bases such as those manufactured by Parker Hannifin Corporation. In some embodiments of the present invention, the track clamps are especially designed to accommodate various sized "Vee" edge tracks manufactured by Bishop-Wisecarver Corporation. For example, the track clamp is designed for tracks sized 0 thru 4, in carbon steel. In some embodiments of the invention, the track and track assembly are chosen to be used with "DualVee"® guide wheels (preferably in steel or stainless steel), manufactured by Bishop-Wisecarver Corporation.

In some embodiments of the present invention, methods of manufacturing track clamps having deformable teeth extrusions are disclosed.

DETAILED DESCRIPTION OF THE INVENTION

Those of ordinary skill in the art will realize that the following detailed description of the present invention is illustrative only and is not intended to limit the claimed invention. Other embodiments of the present invention will readily suggest themselves to such skilled persons having the benefit of this disclosure. It will be appreciated that in the development of any such actual implementation, numerous implementation-specific decisions must be made in order to achieve the developer's specific goals. Reference will now be made in detail to implementations of the present invention as illustrated in the accompanying drawings. The same reference indicators will be used throughout the drawings and the following detailed description to refer to the same or like parts.

Linear motion guides are used extensively in manufacturing processes and other applications. The support bases for linear motion guides are typically standard-sized extrusions. For example, FIG. 1 illustrates an isometric schematic representation of a widely available aluminum extrusion support base 130 manufactured by the Parker Hannifin Corporation. Likewise, tracks and guide wheels for the linear motion guides are typically a standard manufacture and are commercially available. For example, the DualVee® guide wheel and Single Edge Track, both manufactured by Bishop-Wisecarver Corporation, are time-tested and ideal for a wide variety of applications. As discussed above, there is a need for an easy and reliable assembly for coupling a track to a support base.

Figure 2A:
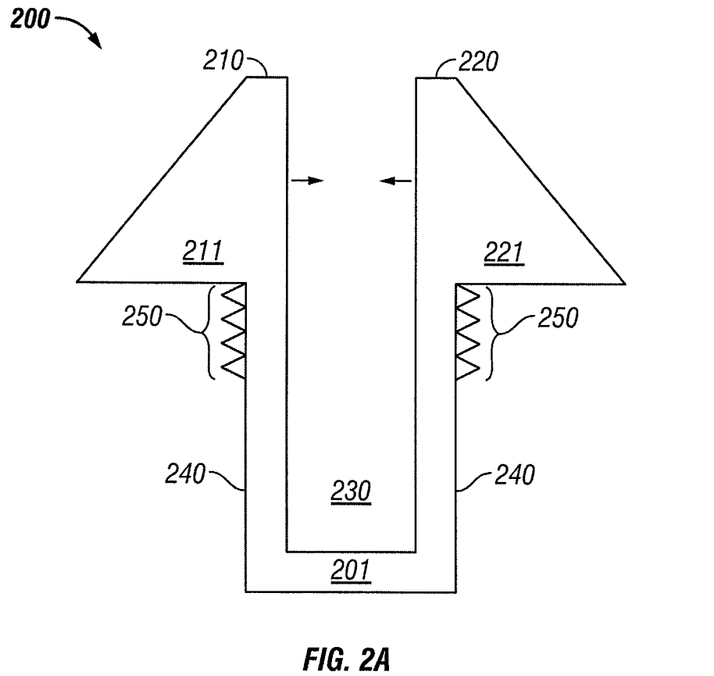
FIG. 2A illustrates an end view of a fastener-less track assembly according to some embodiments of the present invention.

FIG. 2A illustrates a schematic end view of the fastener-less track assembly 200 for coupling a linear motion guide track, e.g. 297 (FIG. 2C), 320 (FIG. 3A), 420 (FIG. 4), to a support base, e.g. 295 (FIG. 2C), 330 (FIG. 3A), 430 (FIG. 4), according to the present preferred embodiments of the present invention. As shown, the track assembly 200 comprises two clamp arms 210, 220 that are connected to a base section 201 to form a well 230. As shown, the two clamp arms 210, 220 extend vertically away from the base section 201 and terminate at a fixed distance from the base section 201, thus defining the well 230.

Figure 3A:
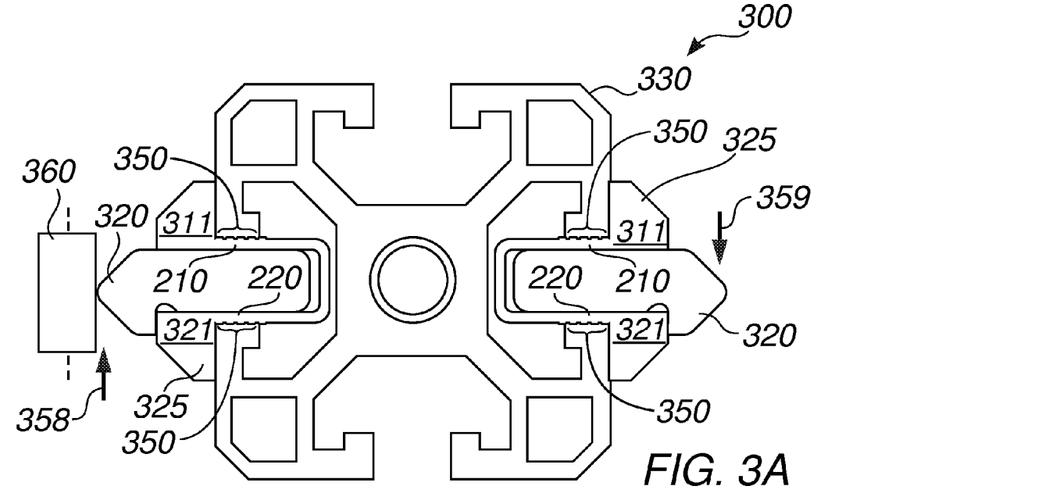
FIG. 3A illustrates an end view of a support base extrusion coupled with a pair of linear motion tracks via fastener-less track assemblies according to some embodiments of the present invention.
Figure 4:
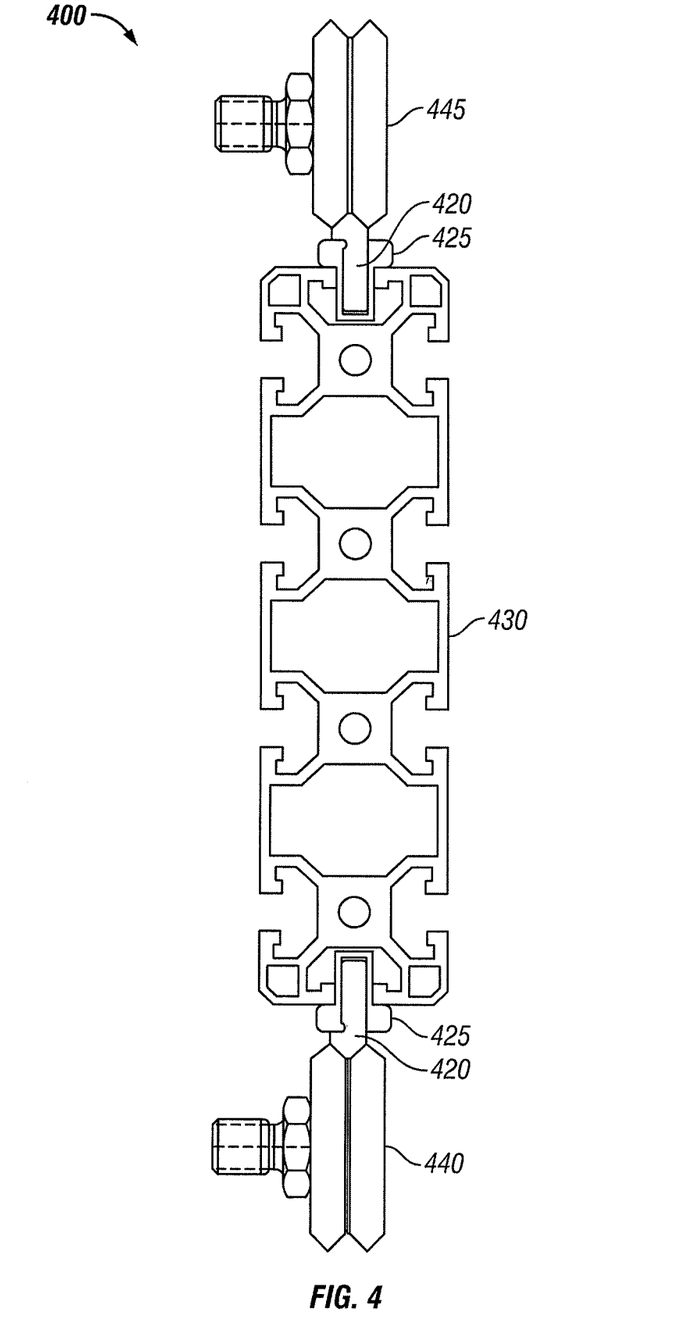
FIG. 4 illustrates a side view of an alternative support base extrusion coupled with a pair of linear motion tracks via fastener-less track assemblies according to some embodiments of the present invention.

The well 230 is configured to accommodate a linear motion guide track, e.g. 297 (FIG. 2C), 320 (FIG. 3A), 420 (FIG. 4). Two shoulders 211, 221 are disposed at the end, and on the outer sides of the clamp arms 210, 220. As described, the track assembly 200 is configured to be inserted into a support base, e.g. 295 (FIG. 2C), 330 (FIG. 3A), 430 (FIG. 4), such that the well 230 is disposed within the support base. Likewise, the support base, e.g. 295, 330, 430, interacts with the shoulders 211, 221 such that the track assembly 200 rests upon the surface of the support base. Additionally, two sets of teeth protrusions 250 are disposed on the outer surfaces 240 of the clamp arms 210, 220. In the present preferred embodiment of the present invention, the teeth protrusions 250 are configured such that they must be deformed to be inserted into a support base, e.g. 295, 330, 430, thus providing a fastener-less coupling.

The teeth protrusions 250 are deformed and/or sheared by the press-fitting into a support base, e.g. 295, 330, 430. Preferably, the deformation of the teeth protrusions 250 causes the clamp arms 210, 220 to be displaced toward each other (as indicated by the arrows). The displacement clamps a linear motion guide track, e.g. 297 (FIG. 2C), 320 (FIG. 3A), 420 (FIG. 4), between the clamp arms 210, 220, thereby securing the linear motion guide track therein.

In some embodiments of the present invention, the deformation of the teeth protrusions 250 effectuates galling between the track assembly 200 and a support base. In some embodiments of the present invention, the deformation of the teeth protrusions 250 effectuates a cold-pressure solid-state welding process.

Figure 2B:
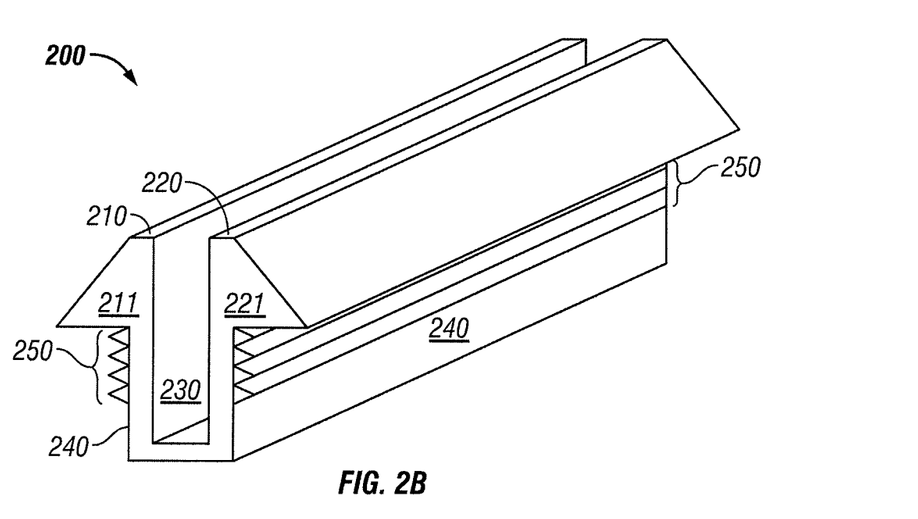
FIG. 2B illustrates an isometric view of a fastener-less track assembly according to some embodiments of the present invention.
Figure 2C:
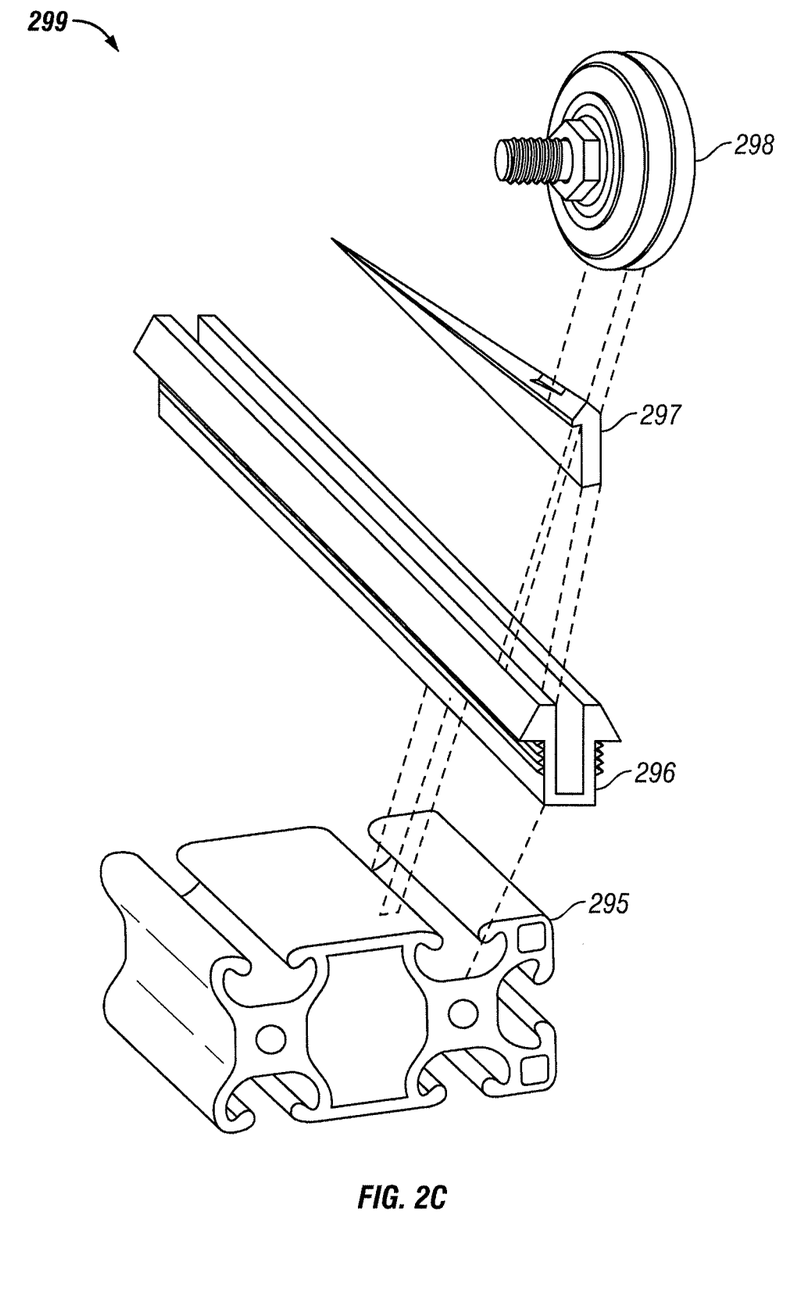
FIG. 2C is an exploded view of a guided motion assembly without requiring fasteners according to some embodiments of the present invention.

FIG. 2B illustrates an isometric schematic view of the assembly 200 according to the present preferred embodiment of the invention. FIG. 2C illustrates an exploded isometric view of a linear motion apparatus 299 comprising a guide wheel 298, a linear motion guide track 297, a track assembly 296, and a support base extrusion 295.

In some embodiments of the present invention, the guide wheel 298 is a DualVee® guide wheel manufactured by Bishop-Wisecarver Corporation. According to these embodiments, the guide wheel 298 is chosen from among "Original V Bearing Guide Wheels", "Studded V Bearing Guide Wheels", and "Integral V Bearing Guide Wheels".

The "Original V Bearing Guide Wheels" consist of both an external and internal 90 degree "Vee" angle. The guide wheel is made with a double row angular contact bearing for excellent load capability and long life. V bearing guide wheels are preferably available in 52100 steel or 440C stainless steel from stock. Other options include seals and shields to meet specific application needs. Special DualVee® guide wheels are available for clean room, vacuum, and elevated temperature applications. Customer specific lubricants can also be used with the guide wheels.

The Studded guide wheels 298 combine the versatility and robustness of the DualVee® v bearing guide wheel 298 with convenience of a thru-hole mounting stud into a single piece. Concentric or eccentric stainless steel studs are riveted onto the wheels for a strong connection.

Integral V Bearing Guide Wheels offer a one piece construction. Sizes 2-4 steel wheels feature a one piece bushing or stud shaft with a machined inner bearing race. Sizes 0-1 steel and all polymer wheels utilize a riveted retaining technology to secure the wheel to the stud. Integral wheels add overmolded high performance polymer DualVee® wheels and MadeWell crown rollers to the DualVee® family to provide further component versatility.

In some embodiments of the present invention, the linear motion guide track 297 is a track manufactured by Bishop- Wisecarver Corp. and is especially designed for DualVee® guide wheels 298. In some embodiments, the linear motion guide track 297 is a single edge linear motion guide track 297, such as the "Vee" edge track, manufactured by Bishop-Wisecarver Corporation. For example, a single edge linear motion guide track 297 in 1045 carbon steel and 420 stainless steel from stock is available and would benefit from the present disclosure. At the "Vee" edge, a mounting shoulder is provided for quick reference during assembly. The single edge linear motion guide track 297 is able to be disposed with or without hardened "Vee surfaces". Hardened linear motion guide track 297 comes in lengths of 20 feet, and can be easily butt-jointed for longer length applications. Non-hardened linear motion guide track 297 comes in lengths up to 22 feet, and also may be butt-jointed for longer lengths. Additionally, all single edge linear motion guide track 297 is able to be manufactured with or without drilled holes for mounting. "Quick-Trak" series clamp extrusion is also available for fast and easy installation of size 3 DualVee® linear motion guide track 297.

FIG. 3A illustrates an end view of a guided motion system 300 comprising a support base 330 with a track assembly 325 and linear motion guide track 320. As shown, the track assembly 325 is pressure fitted into the support base 330. In some embodiments of the present invention, the track assembly 325 is configured such that it is easily coupled with the support base 330 using only basic tools. In the present preferred embodiment of the present invention, the track assembly 325 is configured such that a simple rubber mallet can easily force the track assembly 325 into the support base 330. In some other embodiments, the track is able to be installed by using a cross-head arrangement of rollers 360 to uniformly apply force to insert the track clamp and track into standard structural extrusion support bases. However, it will be readily apparent to those having ordinary skill in the art that a wide variety of coupling mechanisms can be used.

The simple and secure coupling ability of the present invention provides distinct and extremely useful advantages of the approaches known in the art. For example, since linear motion tracks can be easily assembled without expensive and complicated tools, the cost savings of using the track assembly 325 is great. Additionally, the time to install a linear motion track is greatly reduced through the elimination of complicated assembly. By using a track assembly 325 that is compatible with standard extrusions, businesses do not need to invest in all new support bases and may provide consistency in their plant by using the same parts with the new assemblies. Furthermore, the track assemblies 325 of the present invention provide a more secure coupling than other fastener-less approaches.

First, as explained above, teeth protrusions 350 are disposed on the clamp arms 210, 220 of the track assemblies 325. As a result of the pressure fitted coupling, the teeth protrusions 350 are deformed, thus ensuring a secure fit between the track assembly 325 and the support base 330. Additionally, the shoulders 311, 321 provide additional support to the linear motion guide track 320. For example, torque applied to the linear motion guide track 320 (indicated with arrows 358, 359) is resisted by the shoulders 311, 321.

It will be readily apparent to those having ordinary skill in the art that the components disclosed in FIG. 3A, and in other embodiments of the invention may take various sizes, shapes and appearance. In some embodiments, the clamp arms 210, 220 of the track assembly 325 are spaced between 3 mm and 12 mm apart. In some embodiments, the linear motion guide track 320, the support base 330 and the track assembly 325 are between 3 m and 6 m long. In some embodiments, the track assembly 325 as recited is substantially comprised of steel. In some embodiments, the track assembly 325 as recited is substantially comprised of stainless steel. In some embodiments the track assembly 325 is formed by extrusion. In some embodiments the track assembly 325 is formed by metal injection molding.

In some embodiments of the present invention, the deformation of the teeth protrusions 350 effectuates galling between the track assembly 320 and a support base 330. In some embodiments of the present invention, the deformation of the teeth protrusions 350 effectuates a cold-pressure solid-state welding process.

Figure 3B:
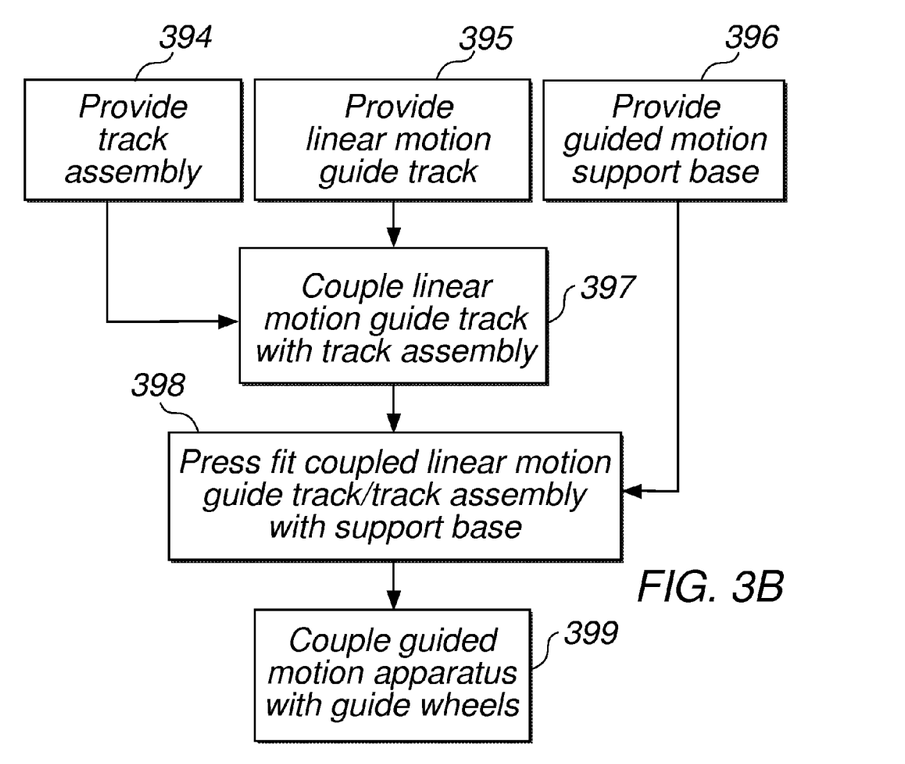
FIG. 3B illustrates process steps for a method of manufacturing a guided motion system.

FIG. 3B illustrates methods steps of manufacturing a guided motion system utilizing the novel track assembly of the present invention. The method starts by providing 396 a guided motion support base, providing 395 a linear motion guide track, and providing 394 a track assembly. Preferably, the linear motion guide track and track assembly are substantially axial. Likewise, the guided motion support base preferably has at least one conduit disposed therein for accepting the track assembly. In some embodiments of the invention, the track assembly has cross section that is substantially U-shaped and has a plurality of teeth protrusions disposed on the outside surface of the track assembly.

The method of manufacturing shown in FIG. 3B continues with coupling 397 the linear motion guide track with the track assembly. Next, the coupled track/track assembly is press-fitted 398 into the conduit of the support base. As explained above, a rubber mallet may easily tap the track/track assembly into the support base. According to some embodiments, the teeth protrusions on the track assembly are deformed when the track assembly is press-fitted in the support base, thus providing a secure coupling. Finally, the assembled guided motion apparatus is slidably coupled 399 with one or more guide wheels.

In some embodiments of the present invention, the method further comprises manufacturing the track, the support base and/or the track assembly. In some embodiments, the components are formed via an extrusion. In other embodiments, the components are formed by metal injection molding.

Figure 5:
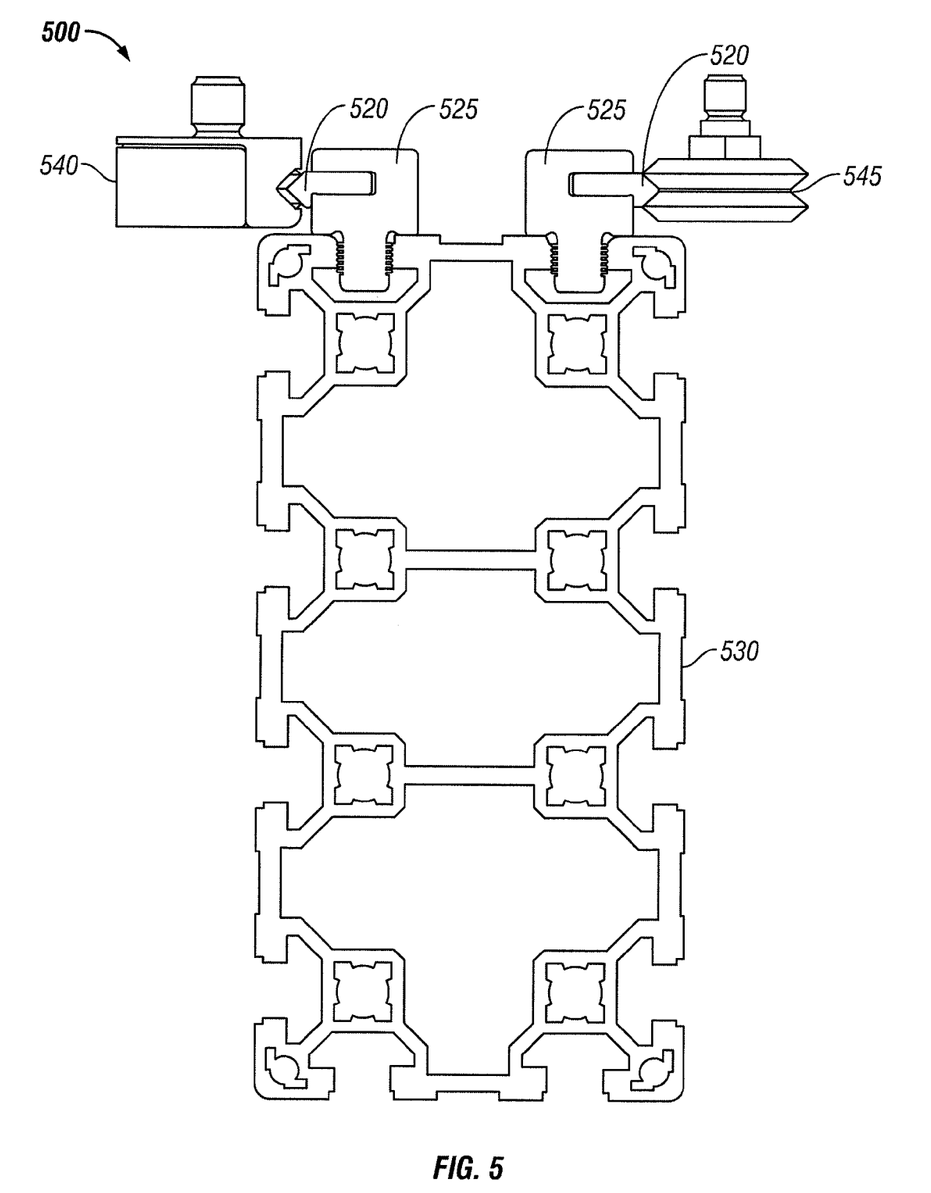
FIG. 5 illustrates a side view of an alternative support base extrusion coupled with a pair of linear motion tracks via fastener-less track assemblies according to some embodiments of the present invention.
Figure 6:
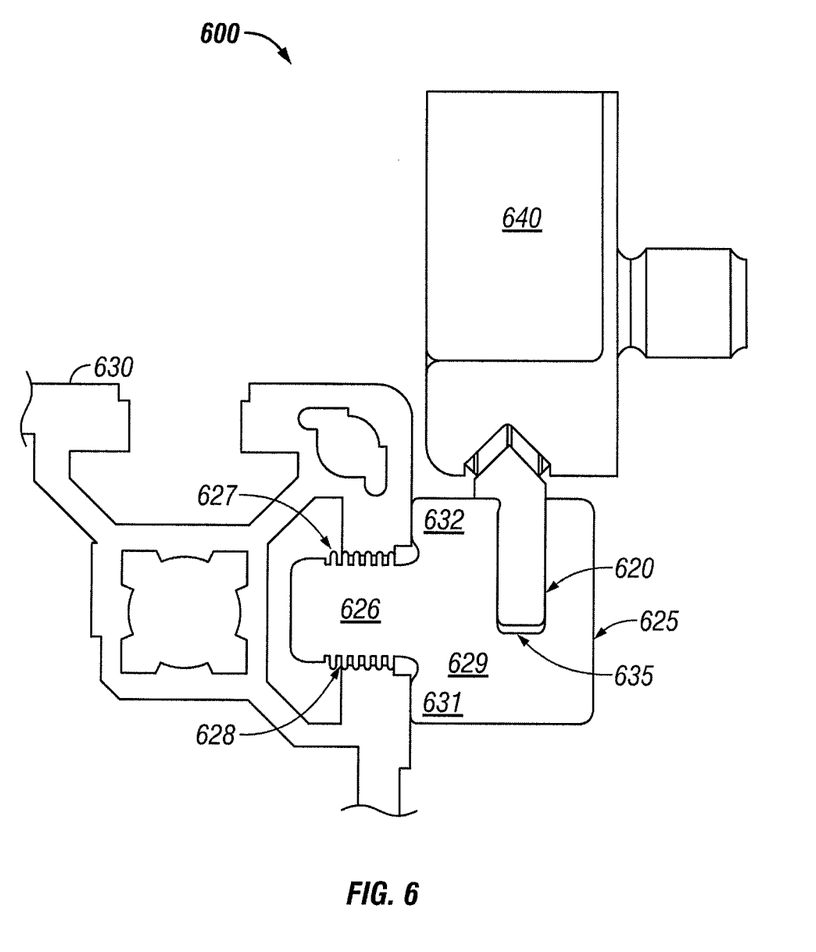
FIG. 6 illustrates a side view of an alternative support base extrusion coupled with a linear motion tracks via fastener-less track assemblies according to some embodiments of the present invention.

FIG. 3A illustrates a support base 330 with two track assemblies 325 and two tracks 320. However, it will be readily apparent to those having ordinary skill in the art, having the benefit of this disclosure, that a number of assembly configurations will benefit from the present invention. FIGS. 4-6 illustrate schematic views of alternate embodiments of linear motion tracks utilizing novel track assemblies according to various embodiments of the present invention.

FIG. 4 illustrates an end schematic view of a linear motion apparatus 400 comprising a support base 430 disposed vertically between two guide wheels 440, 445. The support base 430 is coupled to linear motion guide tracks 420 via track assemblies 425. A plurality of teeth protrusions (not shown) are disposed on each of the track assemblies. As shown, the apparatus 400 is configured to move in and out of the page.

In some embodiments of the present invention, the deformation of the teeth protrusions (not shown) effectuates galling between the track assembly 425 and a support base extrusion 430. In some embodiments of the present invention, the deformation of the teeth protrusions (not shown) effectuates a cold-pressure solid-state welding process.

FIG. 5 illustrates an end schematic view of a linear motion apparatus 500 comprising a support base 530 disposed vertically between two guide wheels 540, 545. The support base 530 is coupled to linear motion guide tracks 520 via track assemblies 525. A plurality of teeth protrusions (not labeled)

are disposed on each of the track assemblies 525. As shown, the linear motion apparatus 500 is configured to move in and out of the page.

In some embodiments of the present invention, the deformation of the teeth protrusions (not shown) effectuates galling between the track assembly 525 and a support base extrusion 530. In some embodiments of the present invention, the deformation of the teeth protrusions (not labeled) effectuates a cold-pressure solid-state welding process.

FIG. 6 illustrates an end schematic view of a linear motion apparatus 600 comprising a support base 630 disposed vertically between two guide wheels 640, 645. The support base 630 is coupled to a linear motion guide track 620 via track assembly 625. A plurality of teeth protrusions 627, 628 are disposed on the track assembly 625. As shown, the linear motion apparatus 600 is configured to move in and out of the page.

In some embodiments of the present invention, the deformation of the teeth protrusions 627, 628 effectuates galling between the track assembly 625 and a support base 630. In some embodiments of the present invention, the deformation of the teeth protrusions 627, 628 effectuates a cold-pressure solid-state welding process.

The track assembly 625 is substantially axial (in and out of page) and includes a substantially axial plug section 626 with a plurality of teeth protrusions 627, 628 disposed on the outer sides of the plug section 626. Additionally, the plug section 626 includes a substantially axial cap section 629 that is coupled to the plug section 626, wherein the cap section 629 is at least partially wider than the plug section 626, forming shoulders 631, 632 which rest upon the surface of the support base 630 when the track assembly 625 is coupled with the support base 630. Furthermore, a well 635 is disposed in the cap section 629, and is configured to hold the linear motion guide track 620 therein. According to some embodiments of the present invention, and as shown in FIG. 6, the orientation of the well 635 within the cap section 629 is substantially orthogonal to the orientation of the plug section 626. In the preferred embodiment of the present invention, the cap section 629 and the plug section 626 are integral.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications can be made in the embodiment chosen for illustration without departing from the spirit and scope of the invention. Specifically, it will be apparent to one of ordinary skill in the art that the device and method of the present invention could be implemented in several different ways and have several different appearances.

The invention claimed is:

1. A method of manufacturing a guided motion system, wherein the method comprises the steps of:
providing a substantially axial linear motion guide track;
providing a guided motion support base having at least one conduit disposed therein that is defined on an outer surface of the guided motion support base between opposing inside surfaces;
providing a substantially axial track assembly, wherein the substantially axial track assembly is comprised of metal, wherein the substantially axial track assembly has a first end that corresponds with a base section, and a second end opposite the first end that corresponds to at least one shoulder section, wherein the at least one shoulder section is at least partially wider than the base section, and wherein the substantially axial track assembly comprises
a well defined within the at least one shoulder section, and
opposing outer surfaces that extend from the at least one shoulder section to the base section, wherein each of the opposing outer surfaces further comprises a plurality of deformable teeth protrusions located between the at least one shoulder section and the base section, wherein each of the deformable teeth protrusions extend outward from the opposing outer surfaces;
coupling the substantially axial linear motion guide track to the well of the substantially axial track assembly to form a coupled track assembly; and
press-fitting the coupled track assembly into the at least one conduit of the guided motion support base to form a guided motion system;
wherein the plurality of deformable teeth protrusions on each of the opposing outer surfaces deform against the opposing inside surfaces of the at least one conduit to retain the substantially axial track assembly within the at least one conduit when the at least one shoulder section of the substantially axial track assembly contacts the outer surface of the guided motion support base;
wherein the plurality of deformable teeth protrusions are configured to effectuate any of galling between the substantially axial track assembly and the opposing inside surfaces of the at least one conduit upon deformation, or cold-pressure solid-state welding between the substantially axial track assembly and the opposing inside surfaces of the at least one conduit upon deformation.

2. The method of claim 1, further comprising the step of:
providing at least one guide wheel configured to be slidably coupled to the substantially axial linear motion guide track.

3. The method of claim 2, further comprising the step of:
coupling the at least one guide wheel with the substantially axial linear motion guide track.

4. The method of claim 1, wherein the step of press-fitting the coupled track assembly into the at least one conduit of the guided motion support base is performed with a cross-head arrangement of rollers.

5. The method of claim 1, further comprising the step of:
forming the substantially axial track assembly via an extrusion.

6. The method of claim 1, further comprising the step of:
forming the substantially axial track assembly via metal injection molding.

7. The method of claim 1, wherein the provided substantially axial track assembly further comprises:
two clamp arms extending vertically away from the base section and terminating at a fixed distance from the base section, forming terminal ends, thus defining the well, wherein the well extends the axial length of the substantially axial track assembly;
wherein the two clamp arms define the opposing outer surfaces of the substantially axial track assembly; and
wherein the at least one shoulder section comprises two shoulder sections, wherein each of the two clamp arms has a corresponding shoulder section that is substantially disposed on the outer side of the clamp arms at the terminal ends of the clamp arms.

8. The method of claim 1, wherein the provided substantially axial track assembly further comprises:

a substantially axial cap section that corresponds with the at least one shoulder section; and a substantially axial plug section that extends from the substantially axial cap section to the base section, wherein the substantially axial plug section defines the opposing outer surfaces of the substantially axial track assembly;

wherein the well is disposed in the substantially axial cap section, and wherein the orientation of the well within the substantially axial cap section is substantially orthogonal to the orientation of the substantially axial plug section.

9. A guided motion track assembly for coupling a substantially axial linear motion guide track of a guided motion system with a guided motion support base having at least one conduit disposed therein that is defined on an outer surface of the guided motion support base between opposing inside surfaces, wherein the guided motion track assembly comprises:

a first end that corresponds with a base section;

a second end opposite the first end that corresponds to at least one shoulder section, wherein the at least one shoulder section is at least partially wider than the base section;

a well defined within the at least one shoulder section; and opposing outer surfaces that extend from the at least one shoulder section to the base section, wherein each of the opposing outer surfaces further comprises a plurality of deformable teeth protrusions located between the at least one shoulder section and the base section, wherein each of the deformable teeth protrusions extend outward from the opposing outer surfaces;

wherein the plurality of deformable teeth protrusions on each of the opposing outer surfaces are configured to deform against the opposing inside surfaces of the at least one conduit to retain the guided motion track assembly within the at least one conduit when the at least one shoulder section of the guided motion track assembly contacts the outer surface of the guided motion support base;

wherein the guided motion track assembly is comprised of metal; and wherein the plurality of deformable teeth protrusions are configured to effectuate any of galling between the guided motion track assembly and the opposing inside surfaces of the at least one conduit upon deformation, or cold-pressure solid-state welding between the guided motion track assembly and the opposing inside surfaces of the at least one conduit upon deformation.

10. The guided motion track assembly of claim 9, wherein the guided motion track assembly is configured to accept a substantially axial linear motion guide track.

11. The guided motion track assembly of claim 9, further comprising:

two clamp arms extending vertically away from the base section and terminating at a fixed distance from the base section, forming terminal ends, thus defining the well, wherein the well extends the axial length of the guided motion track assembly;

wherein the two clamp arms define the opposing outer surfaces of the guided motion track assembly; and wherein the at least one shoulder section comprises two shoulder sections, wherein each of the two clamp arms has a corresponding shoulder section that is substantially disposed on the outer side of the clamp arms at the terminal ends of the clamp arms.

12. The guided motion track assembly of claim 9, wherein the guided motion track assembly is between 3 m and 6 m long.

13. The guided motion track assembly of claim 9, wherein each of the at least one shoulder is substantially trapezoidal.

14. The guided motion track assembly of claim 9, wherein the guided motion track assembly is substantially comprised of steel.

15. The guided motion track assembly of claim 9, wherein the guided motion track assembly is substantially comprised of stainless steel.

16. The guided motion track assembly of claim 9, wherein the guided motion track assembly is formed by extrusion.

17. The guided motion track assembly of claim 9, wherein the guided motion track assembly is formed by metal injection molding.

18. A guided motion system, comprising:

a guided motion support base having at least one axial conduit disposed therein that is defined on an outer surface of the guided motion support base between opposing inside surfaces;

at least one substantially axial linear motion guide track;

at least one guide wheel that is configured to be slidably coupled with the at least one substantially axial linear motion guide track; and at least one substantially U-shaped axial track assembly, wherein the at least one substantially U-shaped axial track assembly is comprised of metal, wherein the at least one substantially U-shaped axial track assembly has a first end that corresponds with two shoulders, and a second end opposite the first end that corresponds with a base section, wherein the first end is at least partially wider than the base section, forming the two shoulders, and wherein the at least one substantially U-shaped axial track assembly comprises two clamp arms extending vertically away from the base section and terminating at a fixed distance from the base section, forming terminal ends, thus defining a well extending the axial length of the at least one substantially U-shaped axial track assembly, wherein the two clamp arms define opposing outer surfaces, wherein each of the two shoulders is substantially disposed on the outer side of the clamp arms at the terminal ends of the clamp arms, wherein each of the opposing outer surfaces further comprises a plurality of deformable teeth protrusions located between the corresponding shoulder and the second end, wherein each of the deformable teeth protrusions extend outward from the opposing outer surfaces;

wherein the plurality of deformable teeth protrusions on each of the opposing outer surfaces are configured to deform against the opposing inside surfaces of the at least one axial conduit to retain the at least one substantially U-shaped axial track assembly within the at least one axial conduit when the two shoulders contact the outer surface of the guided motion support base;

wherein the plurality of deformable teeth protrusions are configured to effectuate any of galling between the at least one substantially U-shaped axial track assembly and the opposing inside surfaces of the at least one axial conduit upon deformation, or cold-pressure solid-state welding between the at least one substantially U-shaped axial track assembly and the opposing inside surfaces of the at least one axial conduit upon deformation; and wherein the two shoulders resist torque applied to the at least one substantially U-shaped axial track assembly.

19. A guided motion system, comprising:
a guided motion support base having at least one axial conduit disposed therein that is defined on an outer surface of the guided motion support base between opposing inside surfaces;
a substantially axial linear motion guide track;
at least one guide wheel configured to be slidably coupled to the substantially axial linear motion guide track; and
at least one substantially axial track assembly, wherein the at least one substantially axial track assembly is comprised of metal, wherein the at least one substantially axial track assembly has a first end that corresponds with a substantially axial cap section, and a second end opposite the first end that corresponds with a substantially axial plug section, wherein the substantially axial cap section is at least partially wider than the substantially axial plug section, forming shoulders, and wherein the at least one substantially axial track assembly comprises
  a well defined within the substantially axial cap section that is configured to hold the substantially axial linear motion guide track therein, and
  opposing outer surfaces that extend from the substantially axial cap section to the second end, wherein each of the opposing outer surfaces further comprises a plurality of deformable teeth protrusions located between the substantially axial cap section and the second end, wherein each of the deformable teeth protrusions extend outward from the opposing outer surfaces;
wherein the plurality of deformable teeth protrusions on each of the opposing outer surfaces are configured to deform against the opposing inside surfaces of the at least one axial conduit to retain the at least one substantially axial track assembly within the at least one axial conduit when the shoulders contact the outer surface of the guided motion support base;
wherein the plurality of deformable teeth protrusions are configured to effectuate any of galling between the at least one substantially axial track assembly and the opposing inside surfaces of the at least one axial conduit upon deformation, or cold-pressure solid-state welding between the at least one substantially axial track assembly and the opposing inside surfaces of the at least one axial conduit upon deformation; and
wherein the shoulders resist torque applied to the at least one substantially axial track assembly.

20. The guided motion system of claim 19, wherein the substantially axial cap section and the substantially axial plug section are integral.

\* \* \* \* \*